US008673452B2

(12) United States Patent
Petzoldt et al.

(10) Patent No.: US 8,673,452 B2
(45) Date of Patent: Mar. 18, 2014

(54) SECURITY AND/OR VALUABLE DOCUMENTS WITH A TOP LAYER WITH A SCRATCH-RESISTANT FINISH

(75) Inventors: Joachim Petzoldt, Monheim (DE); Mehmet-Cengiz Yesildag, Leverkusen (DE); Georgios Tziovaras, Wuppertal (DE)

(73) Assignee: Bayer MaterialScience AG, Leverkusen (DE)

( * ) Notice: Subject to any disclaimer, the term of this patent is extended or adjusted under 35 U.S.C. 154(b) by 127 days.

(21) Appl. No.: 13/307,115

(22) Filed: Nov. 30, 2011

(65) Prior Publication Data

US 2012/0141814 A1    Jun. 7, 2012

(30) Foreign Application Priority Data

Dec. 3, 2010 (EP) .................................... 10193719

(51) Int. Cl.
| | |
|---|---|
| *B32B 27/30* | (2006.01) |
| *B29C 65/00* | (2006.01) |
| *C08F 2/50* | (2006.01) |
| *B42D 15/00* | (2006.01) |
| *B44C 3/08* | (2006.01) |

(52) U.S. Cl.
USPC ............... 428/522; 156/60; 156/220; 283/72; 522/46

(58) Field of Classification Search
None
See application file for complete search history.

(56) References Cited

U.S. PATENT DOCUMENTS

| | | | |
|---|---|---|---|
| 3,692,744 A | 9/1972 | Rich et al. | |
| 4,176,224 A | 11/1979 | Bier et al. | |
| 4,340,532 A | 7/1982 | Lee, Jr. et al. | |
| 4,617,194 A | 10/1986 | Scott et al. | |
| 5,928,780 A | 7/1999 | Schmidt et al. | |
| 6,693,657 B2 | 2/2004 | Carroll, Jr. et al. | |
| 2007/0295689 A1 | 12/2007 | Clauss et al. | |
| 2009/0123757 A1 | 5/2009 | Pudleiner et al. | |
| 2012/0287213 A1 * | 11/2012 | Engel et al. ................... | 347/102 |

FOREIGN PATENT DOCUMENTS

| | | |
|---|---|---|
| DE | 1900270 A1 | 11/1969 |
| DE | 2407674 A1 | 10/1974 |
| DE | 2407776 A1 | 9/1975 |
| DE | 2715932 A1 | 10/1978 |
| DE | 195 22 397 A1 | 1/1997 |
| DE | 10 2007 054 046 A1 | 6/2009 |
| GB | 1464449 A | 2/1977 |
| JP | 2000-119553 A | 4/2000 |
| JP | 2004-315546 A | 11/2004 |
| JP | 2005-280288 A | 10/2005 |
| JP | 2008-006708 A | 1/2008 |
| JP | 2009-028956 A | 2/2009 |
| WO | WO-00/50250 A1 | 8/2000 |
| WO | WO-2004/050766 A1 | 6/2004 |
| WO | WO-2004/050767 A1 | 6/2004 |
| WO | WO-2006/042714 A1 | 4/2006 |

OTHER PUBLICATIONS

*Organic Coatings: Science and Technology* (1994), Chapter 22, John Wiley & Sons, pp. 417-432.
European Search Report dated Feb. 22, 2012.

* cited by examiner

*Primary Examiner* — Sheeba Ahmed
(74) *Attorney, Agent, or Firm* — Novak Druce Connolly Bove + Quigg LLP

(57) ABSTRACT

The invention relates to a security and/or valuable document containing a scratch-resistant coating obtained from a lacquer composition comprising
I) from 12 to 70 parts by wt. of a $C_2$-$C_{12}$-diol diacrylate or $C_2$-$C_{12}$-diol dimethacrylate,
II) from 12 to 40 parts by wt. of an alkoxylated mono-, di-, tri-, tetra-, penta- or hexaacrylate or alkoxylated mono-, di-, tri-, tetra-, penta- or hexamethacrylate,
III) from 0 to 40 parts by wt. of a monomer selected from the group consisting of pentaerythritol triacrylate, pentaerythritol tetraacrylate, dipentaerythritol tetraacrylate, dipentaerythritol pentaacrylate, dipentaerythritol hexaacrylate, pentaerythritol trimethacrylate, pentaerythritol tetramethacrylate, dipentaerythritol tetramethacrylate, dipentaerythritol pentamethacrylate, dipentaerythritol hexamethacrylate, reaction products thereof with aliphatic or aromatic diisocyanates, and mixtures thereof,
IV) from 5 to 60 parts by wt. of a further mono-, di- or triacrylate or mono-, di- or trimethacrylate,
and further comprises
V) from 0.1 to 10 parts by wt. of a photoinitiator.

15 Claims, No Drawings

SECURITY AND/OR VALUABLE DOCUMENTS WITH A TOP LAYER WITH A SCRATCH-RESISTANT FINISH

CROSS-REFERENCE TO RELATED APPLICATIONS

Priority is claimed to European Patent Application No. 10193719.1, filed on Dec. 3, 2010, which is incorporated herein by reference in its entirety for all useful purposes.

BACKGROUND

The invention relates to security and/or valuable documents comprising at least one scratch-resistant coating as the top layer on at least one outer side, a process for the production thereof, a thermoplastic film coated with such a scratch-resistant coating and a lacquer composition for such a scratch-resistant coating.

Security and/or valuable documents, in particular identification documents, such as e.g. personalized ID cards, are in general produced by laminating several different layers which assume various functions in the card, usually in the form of individual films, to form a card. Structures with dimensions in the µm range are often additionally impressed here into the outer surface as security features during the laminating operation.

However, the thermoplastic materials preferably employed for such documents as a rule have relatively soft, scratch-sensitive surfaces. As a result, the readability suffers during the life of such a document of up to ten years. Security features can moreover be destroyed.

A further typical requirement of personalized ID cards is flexibility and breaking strength. In spite of often repeated flexural stress, the functioning of the card itself, but also of incorporated components, such as electronic chips or RFID antennae, should not be impaired.

Card reading apparatuses specifically often lead to scratches on the card surface, which reduce the flexibility and breaking strength of the card and therefore shorten the life of the card.

In order to ensure the functionality of the cards over their life mechanically and also with respect to readability, many manufacturers of personalized ID cards attempt to provide the outer sides of the cards with a scratch-resistant protective layer, which furthermore should have a good resistance to chemicals.

Conventional scratch-resistant lacquers based on acrylates, such as are used for electronics housings and lenses/displays, have outstanding scratch resistances and resistances to chemicals due to their high crosslinking density. The disadvantage of such systems, however, lies in an embrittlement accompanying the crosslinking density. This has the effect that the breaking strength of the card is impaired overall due to notching (fracture in the coating).

A further disadvantage is that the impressability of such highly crosslinked polymers is reduced. The highly crosslinked polymer can no longer be deformed sufficiently to accommodate relatively fine structures of the master in an adequate image sharpness.

There are set-ups for introducing into the coating, for flexibilizing such highly crosslinked scratch-resistant coatings, non-crosslinked polymers, such as e.g. polyvinyl acetate (cf. JP-A 2009-028956) or polyethylene wax (cf. JP-A 2008-006708). In this case, however, the resistance of the coatings to chemicals and therefore the life of the documents are reduced.

Possibilities also exist for subsequently laminating scratch-resistant coatings, which, for example, do not withstand the high laminating temperatures during the production of the ID cards, on to the finished card blank at lower temperatures via transfer films and optionally the additional use of adhesive layers (cf. e.g. JP-A 2005-280288, JP-A 2008-006708 and WO-A 2000/050250) or for subsequently applying them to the finished card blank as a lacquer coating (cf. e.g. JP-A 2004-315546 and JP-A 2000-119553). However, these processes comprise at least one additional, cost-intensive process step for application of the scratch-resistant coating. There is furthermore the disadvantage that in the case where transfer films are not used at the same time as the lamination of the card, impressing into the surface may take place, and in the case of subsequent application of a lacquer layer, any impressed structures are not retained in the desired sharpness.

There accordingly continued to be a need for a possibility of producing security and/or valuable documents, in particular identification documents, such as e.g. ID cards, with an outer scratch-resistant coating which withstands the relatively high lamination temperatures during the production of the documents, renders possible embossing with structures in the micrometer scale and meets the requirements of flexural and breaking strength of such documents, without thereby significantly losing scratch resistance or resistance to chemicals.

BRIEF DESCRIPTION OF PREFERRED EMBODIMENTS

An object on which the present invention was based was accordingly to discover a composition for such a scratch-resistant coating and therefore a correspondingly finished security and/or valuable document and a process for the production of such a security and/or valuable document.

This object has been achieved, surprisingly, by a scratch-resistant coating which is produced from a lacquer composition with acrylate or methacrylate units coordinated specifically to one another.

An embodiment of the present invention provides a security and/or valuable document comprising a scratch-resistant coating obtained from a lacquer composition comprising I) from 12 to 70 parts by wt. of a $C_2$-$C_{12}$-diol diacrylate or $C_2$-$C_{12}$-diol dimethacrylate, wherein $C_2$-$C_{12}$ represents a linear alkylene radical which can be optionally substituted by a methyl group or can be interrupted by one or more oxygen atom(s) and optionally substituted by one or more methyl group(s), II) from 12 to 40 parts by wt. of an alkoxylated mono-, di-, tri-, tetra-, penta- or hexaacrylate or alkoxylated mono-, di-, tri-, tetra-, penta- or hexamethacrylate, III) from 0 to 40 parts by wt. of a monomer selected from the group consisting of pentaerythritol triacrylate, pentaerythritol tetraacrylate, dipentaerythritol tetraacrylate, dipentaerythritol pentaacrylate, dipentaerythritol hexaacrylate, pentaerythritol trimethacrylate, pentaerythritol tetramethacrylate, dipentaerythritol tetramethacrylate, dipentaerythritol pentamethacrylate, dipentaerythritol hexamethacrylate, reaction products thereof with aliphatic or aromatic diisocyanates, and mixtures thereof, IV) from 5 to 60 parts by wt. of a further mono-, di- or triacrylate or mono-, di- or trimethacrylate, wherein the parts by weight of components I) to IV) add up to 100 parts by wt., and, in addition to the 100 parts by wt., the lacquer composition further comprises V) from 0.1 to 10 parts by wt. of a photoinitiator.

Another embodiment of the present invention is the above security and/or value document, wherein the lacquer composition comprises from 15 to 60 parts by wt of component I).

Another embodiment of the present invention is the above security and/or value document, wherein the lacquer composition comprises from 12 to 35 parts by wt. of component II).

Another embodiment of the present invention is the above security and/or value document, wherein the lacquer composition comprises from 0 to 30 parts by wt. of component III).

Another embodiment of the present invention is the above security and/or value document, wherein the security and/or valuable document is an identification document.

Another embodiment of the present invention is the above security and/or value document, wherein the security and/or valuable document comprises the scratch-resistant coating obtained from the lacquer composition on both sides of the security and/or valuable document.

Another embodiment of the present invention is the above security and/or value document, wherein an item of information has been impressed in the scratch-resistant coating.

Yet another embodiment of the present invention provides a process for the production of a lacquer composition for a scratch-resistant coating for a security and/or valuable document comprising contacting at least I) from 12 to 70 parts by wt. of a $C_2$-$C_{12}$-diol diacrylate or $C_2$-$C_{12}$-diol dimethacrylate, wherein $C_2$-$C_{12}$ represents a linear alkylene radical which can be optionally substituted by a methyl group or can be interrupted by one or more oxygen atom(s) and optionally substituted by one or more methyl group(s), II) from 12 to 40 parts by wt. of an alkoxylated mono-, di-, tri-, tetra-, penta- or hexaacrylate or alkoxylated mono-, di-, tri-, tetra-, penta- or hexamethacrylate, III) from 0 to 40 parts by wt. of a monomer selected from the group consisting of pentaerythritol triacrylate, pentaerythritol tetraacrylate, dipentaerythritol tetraacrylate, dipentaerythritol pentaacrylate, dipentaerythritol hexaacrylate, pentaerythritol trimethacrylate, pentaerythritol tetramethacrylate, dipentaerythritol tetramethacrylate, dipentaerythritol pentamethacrylate, dipentaerythritol hexamethacrylate, reaction products thereof with aliphatic or aromatic diisocyanates, and mixtures thereof, IV) from 5 to 60 parts by wt. of a further mono-, di- or triacrylate or mono-, di- or trimethacrylate, wherein the parts by weight of components I) to IV) add up to 100 parts by wt., and, in addition to the 100 parts by wt., V) from 0.1 to 10 parts by wt. of at least one photoinitiator.

A scratch-resistant coating produced from this specific lacquer composition according to the invention withstands the relatively high lamination temperatures during the production of the documents and renders possible an impressing with structures in the micrometer scale without thereby showing cracks. In addition, this coating meets the requirements of flexural and breaking strength of such documents. The coating furthermore shows a good scratch resistance and resistance to chemicals. There is moreover the possibility, due to the scratch-resistant coating produced from this specific lacquer composition according to the invention, of writing items of information, preferably also personalized items of information, into the documents by means of laser without impairment.

Such a scratch-resistant coating therefore renders possible the production of the security and/or valuable documents according to the invention in that for the production of the outer scratch-resistant coating, a thermoplastic film provided with a scratch-resistant finish with a corresponding coating can be employed directly in the lamination of the card blank.

Yet another embodiment of the present invention is a process for the production of a security and/or valuable document comprising forming a film stack comprising a plurality of thermoplastic films, wherein at least one of the thermoplastic films has a first outwardly facing side having a scratch-resistant coating and laminating the film stack, wherein the scratch-resistant coating is obtained from a lacquer composition comprising I) from 12 to 70 parts by wt. of a $C_2$-$C_{12}$-diol diacrylate or $C_2$-$C_{12}$-diol dimethacrylate, wherein $C_2$-$C_{12}$ represents a linear alkylene radical which can be optionally substituted by a methyl group or can be interrupted by one or more oxygen atom(s) and optionally substituted by one or more methyl group(s), II) from 12 to 40 parts by wt. of an alkoxylated mono-, di-, tri-, tetra-, penta- or hexaacrylate or alkoxylated mono-, di-, tri-, tetra-, penta- or hexamethacrylate, III) from 0 to 40 parts by wt. of a monomer selected from the group consisting of pentaerythritol triacrylate, pentaerythritol tetraacrylate, dipentaerythritol tetraacrylate, dipentaerythritol pentaacrylate, dipentaerythritol hexaacrylate, pentaerythritol trimethacrylate, pentaerythritol tetramethacrylate, dipentaerythritol tetramethacrylate, dipentaerythritol pentamethacrylate, dipentaerythritol hexamethacrylate, reaction products thereof with aliphatic or aromatic diisocyanates, and mixtures thereof, IV) from 5 to 60 parts by wt. of a further mono-, di- or triacrylate or mono-, di- or trimethacrylate, wherein the parts by weight of components I) to IV) add up to 100 parts by wt., and, in addition to the 100 parts by wt., the lacquer composition further comprises V) from 0.1 to 10 parts by wt. of a photoinitiator.

Another embodiment of the present invention is the above process, wherein the plurality of thermoplastic films comprises a thermoplastic film having a second outwardly facing side, which, in addition to the first outwardly facing side, also has the scratch-resistant coating.

Another embodiment of the present invention is the above process, wherein the process further comprises impressing an item of information in the outwardly facing side the thermoplastic film.

Another embodiment of the present invention is the above process, wherein the process further comprises impressing an item of information in the outwardly facing side the thermoplastic film and/or the second outwardly facing side of the thermoplastic film.

Another embodiment of the present invention is the above process, wherein the thermoplastic film having the scratch-resistant coating is a film comprising a polycarbonate or copolycarbonate.

In the processes according to embodiments of the invention, as a result additional process steps, such as e.g. the subsequent application of a lacquer coating and curing thereof or the subsequent laminating on of a scratch-resistant coating with the aid of a transfer film which is to be removed afterwards, can be omitted.

The thermoplastic film which has been provided with a scratch-resistant coating for the process according to the invention has likewise not yet hitherto been described.

Yet another embodiment of the present invention is a thermoplastic film having a surface coated with a coating obtained from a lacquer composition comprising I) from 12 to 70 parts by wt. of a $C_2$-$C_{12}$-diol diacrylate or $C_2$-$C_{12}$-diol dimethacrylate, wherein $C_2$-$C_{12}$ represents a linear alkylene radical which can be optionally substituted by a methyl group or can be interrupted by one or more oxygen atom(s) and optionally substituted by one or more methyl group(s), II) from 12 to 40 parts by wt. of an alkoxylated mono-, di-, tri-, tetra-, penta- or hexaacrylate or alkoxylated mono-, di-, tri-, tetra-, penta- or hexamethacrylate, III) from 0 to 40 parts by wt. of a monomer selected from the group consisting of pentaerythritol triacrylate, pentaerythritol tetraacrylate, dipentaerythritol tetraacrylate, dipentaerythritol pentaacrylate, dipentaerythritol hexaacrylate, pentaerythritol trimethacrylate, pentaerythritol tetramethacrylate, dipentaerythritol pentamethacrylate, dipentaerythritol hexamethacrylate, reaction products thereof with aliphatic or aromatic diisocyanates, and mixtures thereof, IV) from 5 to 60 parts by wt. of a further mono-, di- or triacrylate or mono-, di- or trimethacrylate, wherein the parts by weight of components I) to IV) add up to 100 parts by wt., and, in addition to the 100 parts by wt., the lacquer composition further comprises V) from 0.1 to 10 parts by wt. of a photoinitiator.

Such a lacquer composition coordinated in this way specifically in the acrylate and methacrylate monomers with respect to one another also has not hitherto been described. Yet another embodiment of the present invention therefore provides a lacquer composition comprising I) from 12 to 70 parts by wt. of a $C_2$-$C_{12}$-diol diacrylate or $C_2$-$C_{12}$-diol dimethacrylate, wherein $C_2$-$C_{12}$ represents a linear alkylene radical which can be optionally substituted by a methyl group or can be interrupted by one or more oxygen atom(s) and optionally substituted by one or more methyl group(s), II) from 12 to 40 parts by wt. of an alkoxylated mono-, di-, tri-, tetra-, penta- or hexaacrylate or alkoxylated mono-, di-, tri-, tetra-, penta- or hexamethacrylate, III) from 0 to 40 parts by wt. of a monomer selected from the group consisting of pentaerythritol triacrylate, pentaerythritol tetraacrylate, dipentaerythritol tetraacrylate, dipentaerythritol pentaacrylate, dipentaerythritol hexaacrylate, pentaerythritol trimethacrylate, pentaerythritol tetramethacrylate, dipentaerythritol pentamethacrylate, dipentaerythritol hexamethacrylate, reaction products thereof with aliphatic or aromatic diisocyanates, and mixtures thereof, IV) from 5 to 60 parts by wt. of a further mono-, di- or triacrylate or mono-, di- or trimethacrylate, wherein the parts by weight of components I) to IV) add up to 100 parts by wt., and, in addition to the 100 parts by wt., the lacquer composition further comprises V) from 0.1 to 10 parts by wt. of a photoinitiator.

Another embodiment of the invention therefore also provides the use of a lacquer composition containing I) 12 to 70 parts by wt. of at least one $C_2$-$C_{12}$-diol diacrylate or $C_2$-$C_{12}$-diol dimethacrylate, wherein $C_2$-$C_{12}$ represents a linear alkylene radical which can be optionally substituted by a methyl group or can be interrupted by one or more oxygen atom(s) and optionally substituted by one or more methyl group(s), II) 12 to 40 parts by wt. of at least one alkoxylated, preferably ethoxylated mono-, di-, tri-, tetra-, penta- or hexaacrylate or alkoxylated, preferably ethoxylated mono-, di-, tri-, tetra-, penta- or hexamethacrylate, III) 0 to 40 parts by wt. of at least one monomer chosen from the group including pentaerythritol triacrylate, pentaerythritol tetraacrylate, dipentaerythritol tetraacrylate, dipentaerythritol pentaacrylate, dipentaerythritol hexaacrylate, pentaerythritol trimethacrylate, pentaerythritol tetramethacrylate, dipentaerythritol tetramethacrylate, dipentaerythritol pentamethacrylate, dipentaerythritol hexamethacrylate and possible reaction products thereof with aliphatic or aromatic diisocyanates, IV) 5 to 60 parts by wt. of at least one further mono-, di- or triacrylate or mono-, di- or trimethacrylate, wherein the parts by weight of components I) to IV) add up to 100 parts by wt., and, in addition to these 100 parts by wt., at least containing V) 0.1 to 10 parts by wt. of at least one photoinitiator, for the production of at least one scratch-resistant coating of a security and/or valuable document.

DETAILED DESCRIPTION

As used herein, the singular terms "a" and "the" are synonymous and used interchangeably with "one or more" and "at least one," unless the language and/or context clearly indicates otherwise. Accordingly, for example, reference to "a monomer" herein or in the appended claims can refer to a single monomer or more than one monomer. Additionally, all numerical values, unless otherwise specifically noted, are understood to be modified by the word "about."

The lacquer composition according to the invention or employed according to the invention for the production of the scratch-resistant coating—called lacquer composition in the following—preferably contains 15 to 60 parts by wt., particularly preferably 20 to 55 parts by wt. of component I). The parts by weight mentioned are the sum of the parts by weight of all the diacrylates or dimethacrylates from which component I) is composed.

Component I) is preferably at least one $C_4$-$C_{12}$-diol diacrylate or $C_4$-$C_{12}$-diol dimethacrylate, particularly preferably at least one $C_4$-$C_8$-diol diacrylate or $C_4$-$C_8$-diol dimethacrylate. The $C_2$-$C_{12}$, preferably $C_4$-$C_{12}$, particularly preferably $C_4$-$C_8$ units are preferably linear alkylene radicals which can be optionally substituted by a methyl group or can be interrupted by one or more oxygen atom(s) and optionally substituted by one or more methyl group(s), They are preferably linear alkene radicals which can be optionally interrupted by one or more oxygen atom(s).

Possible suitable diol diacrylates or diol dimethacrylates are very particularly preferably those of the general formula (I)

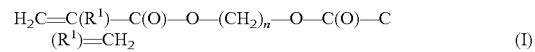

(I)

wherein
$R^1$ represents H or $CH_3$, preferably H, and
n represents an integer from 2 to 12, preferably from 4 to 12, particularly preferably from 4 to 8.

Possible suitable diol diacrylates or diol dimethacrylates are furthermore very particularly preferably those of the general formula (II)

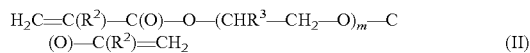

(II)

wherein $R^2$ represents H or $CH_3$, preferably H, $R^3$ represents H or $CH_3$, and m represents an integer from 2 to 5, preferably from 2 to 4.

Suitable $C_4$-$C_8$-diol diacrylates or -diol dimethacrylates are, for example, diethylene glycol diacrylate, diethylene glycol dimethacrylate, triethylene glycol diacrylate, triethylene glycol dimethacrylate, tetraethylene glycol diacrylate, tetraethylene glycol dimethacrylate, dipropylene glycol diacrylate, dipropylene glycol dimethacrylate, tripropylene glycol diacrylate, tripropylene glycol dimethacrylate, 1,4-butanediol diacrylate, 1,4-butanediol dimethacrylate, 1,5-pentanediol diacrylate, 1,5-pentanediol dimethacrylate, 1,6-hexanediol diacrylate, 1,6-hexanediol dimethacrylate, 3-methyl-1,5-pentanediol diacrylate, 3-methyl-1,5-pentanediol dimethacrylate, 1,7-heptanediol diacrylate, 1,7-heptanediol dimethacrylate, 1,8-octanediol diacrylate and/or 1,8-octanediol dimethacrylate. $C_4$-$C_{12}$-Diol diacrylates or -diol dimethacrylates which are moreover suitable are, for example, 1,9-nonanediol diacrylate, 1,9-nonanediol dimethacrylate, 2-methyl-1,8-octanediol diacrylate, 2-methyl-1,8-octanediol dimethacrylate, 1,10-decanediol diacrylate, 1,10-decanediol dimethacrylate, 1,11-undecanediol diacrylate, 1,11-undecanediol dimethacrylate, 1,12-dodecanediol diacrylate and/or 1,12-dodecanediol dimethacrylate. $C_2$-$C_{12}$-Diol diacrylates or -diol dimethacrylates which are moreover suitable are, for example, ethylene glycol diacrylate, ethylene glycol dimethacrylate, 1,3-propanediol diacrylate and/or 1,3-propanediol dimethacrylate. The particular diacrylates are very particularly preferred. 1,6-Hexanediol diacrylate and/or 1,6-hexanediol dimethacrylate, diethylene glycol diacrylate and diethylene glycol dimethacrylate are particularly preferred, especially preferably 1,6-hexanediol diacrylate and diethylene glycol diacrylate.

The lacquer composition preferably contains 12 to 35 parts by wt., particularly preferably 15 to 30 parts by wt., very particularly preferably 20 to 30 parts by wt. of component II). The parts by weight mentioned are the sum of the parts by weight of all the alkoxylated mono-, di- or triacrylates or -methacrylates from which component II) is composed.

The alkoxylated monoacrylates or -methacrylates for component II) can be alkoxylated optionally substituted aliphatic, cycloaliphatic, aromatic or mixed aromatic-aliphatic monoacrylates or -methacrylates. In this context, both alkoxylated linear and branched aliphatic monoacrylates or -methacrylates, in which the alkyl chain can furthermore be interrupted by one or more hetero atoms, such as e.g. oxygen atoms, are possible. In the case of the cycloaliphatic or aromatic monoacrylates or -methacrylates, heterocyclic or heteroaromatic monoacrylates or -methacrylates are also possible.

Examples of such alkoxylated monoacrylates or -methacrylates are alkoxylated, preferably ethoxylated methyl acrylate, ethyl acrylate, n-butyl acrylate, isobutyl acrylate, t-butyl acrylate, 2-ethylhexyl acrylate, isodecyl acrylate, n-lauryl acrylate, $C_{12}$-$C_{15}$-alkyl acrylates, n-stearyl acrylate, n-butoxyethyl acrylate, butoxy-diethylene glycol acrylate, methoxy-triethylene glycol acrylate, cyclohexyl acrylate, tetrahydrofurfuryl acrylate, benzyl acrylate, 2-phenoxyethyl acrylate, isobornyl acrylate, 2-hydroxyethyl acrylate, 2-hydroxypropyl acrylate, 2-hydroxyethyl acrylate, 2-hydroxybutyl acrylate, 2-hydroxybutyl acrylate and the corresponding alkoxylated, preferably ethoxylated methacrylates.

The alkoxylated diacrylates or -methacrylates for component II) can be, for example, those which differ from the diol diacrylates and -methacrylates of component I).

Examples of such alkoxylated diacrylates or -methacrylates are alkoxylated, preferably ethoxylated methanediol diacrylate, methanediol dimethacrylate, glycerol diacrylate, glycerol dimethacrylate, neopentyl glycol diacrylate, neopentyl glycol dimethacrylate, 2-butyl-2-ethyl-1,3-propanediol diacrylate, 2-butyl-2-ethyl-1,3-propanediol dimethacrylate, trimethylolpropane diacrylate or trimethylolpropane dimethacrylate.

Examples of alkoxylated triacrylates or -methacrylates for component II) are alkoxylated, preferably ethoxylated pentaerythritol triacrylate, pentaerythritol trimethacrylate, glycerol triacrylate, glycerol trimethacrylate, 1,2,4-butanetriol triacrylate, 1,2,4-butanetriol trimethacrylate, trimethylolpropane triacrylate, trimethylolpropane trimethacrylate, tricyclodecanedimethanol diacrylate, tricyclodecanedimethanol dimethacrylate, ditrimethylolpropane tetraacrylate or ditrimethylolpropane tetramethacrylate.

Examples of alkoxylated tetra-, penta- or hexaacrylates are alkoxylated, preferably ethoxylated pentaerythritol tetraacrylate, dipentaerythritol tetraacrylate, dipentaerythritol pentaacrylate, dipentaerythritol hexaacrylate, pentaerythritol tetramethyacrylate, dipentaerythritol tetramethyacrylate, dipentaerythritol pentamethacrylate or dipentaerythritol hexamethacrylate.

In the alkoxylated diacrylates or -methacrylates, triacrylates or -methacrylates, tetraacrylates or -methacrylates, pentaacrylates or -methacrylates and/or alkoxylated hexaacrylates or -methacrylates of component II), all the acrylate groups or methacrylate groups or only some of the acrylate groups or methacrylate groups in the particular monomer can be bonded to the corresponding radical via alkylene oxide groups. Any desired mixtures of such completely or partly alkoxylated di-, tri-, tetra-, penta- or hexaacrylates or -methacrylates can also be employed. In this context it is also possible for the acrylate or methacrylate group(s) to be bonded to the aliphatic, cycloaliphatic or aromatic radical of the monomer via several successive alkylene oxide groups, preferably ethylene oxide groups. The average number of alkylene oxide or ethylene oxide groups in the monomer is given by the degree of alkoxylation or degree of ethoxylation. The degree of alkoxylation or degree of ethoxylate can preferably be from 2 to 25, and degrees of alkoxylation or degrees of ethoxylation of from 2 to 15 are particularly preferred, very particularly preferably from 3 to 9.

Component II) preferably contains alkoxylated, preferably ethoxylated di- and/or triacrylates. Component II) particularly preferably contains at least one alkoxylated, preferably ethoxylated di- or triacrylate or at least one alkoxylated, preferably ethoxylated di- or trimethacrylate, very particularly preferably an ethoxylated di- or triacrylate. In preferred embodiments of the invention, component II) contains at least one ethoxylated triacrylate or -methacrylate, preferably ethoxylated triacrylate Particularly preferably, component II) contains alkoxylated trimethylolpropane triacrylate and/or trimethylolpropane trimethacrylate. In preferred embodiments, component II) contains ethoxylated trimethylolpropane triacrylate and/or trimethylolpropane trimethacrylate, preferably ethoxylated trimethylolpropane triacrylate. In preferred embodiments, the degree of ethoxylation of the trimethylolpropane triacrylates and/or trimethylolpropane trimethacrylates is 2 to 25, particularly preferably 2 to 15, very particularly preferably 3 to 9.

The lacquer composition preferably contains 0 to 30 parts by wt., particularly preferably 0.1 to 30 parts by wt. of component III). In particularly preferred embodiments, the lacquer composition contains component III). The parts by weight mentioned are the sum of the parts by weight of all the monomers from the group mentioned from which component III) is composed.

Component III) comprises monomers chosen from the group including pentaerythritol triacrylate, pentaerythritol tetraacrylate, dipentaerythritol tetraacrylate, dipentaerythritol pentaacrylate, pentaerythritol trimethacrylate, pentaerythritol tetramethacrylate, dipentaerythritol tetramethacrylate, dipentaerythritol pentamethacrylate and reaction products thereof with aliphatic or aromatic diisocyanates and including dipentaerythritol hexaacrylate and dipentaerythritol hexamethacrylate. Preferably, component III) comprises mixtures containing two or more of the abovementioned monomers.

Suitable aliphatic diisocyanates are linear aliphatic, branched aliphatic and/or cycloaliphatic diisocyanates. Examples of such aliphatic diisocyanates are 1,4-butylene-diisocyanate, 1,6-hexamethylene-diisocyanate (HDI), isophorone-diisocyanate (IPDI), 2,2,4- and/or 2,4,4-trimethyl-hexamethylene-diisocyanate, the isomeric bis(4,4'-isocyanatocyclohexyl)methanes or mixtures thereof of any desired isomer content, 1,4-cyclohexylene-diisocyanate, 4-isocyanatomethyl-1,8-octane-diisocyanate (nonane-triisocyanate), alkyl 2,6-diisocyanato-hexanoates (lysine-diisocyanates) with alkyl groups having 1 to 8 carbon atoms and mixtures of these.

Examples of aromatic diisocyanates are 1,4-phenylene-diisocyanate, 2,4- and/or 2,6-toluoylene-diisocyanate (TDI), 1,5-naphthylene-diisocyanate, 2,2'- and/or 2,4'- and/or 4,4'-diphenylmethane-diisocyanate, 1,3- and/or 1,4-bis-(2-isocyanato-prop-2-yl)-benzene (TMXDI), 1,3-bis(isocyanatomethyl)benzene (XDI) and mixtures of these.

Preferred aliphatic or aromatic diisocyanates are 1,6-hexamethylene-diisocyanate (HDI), isophorone-diisocyanate (IPDI) or 2,4- and/or 2,6-toluoylene-diisocyanate (TDI).

In very preferred embodiments, component III) contains pentaerythritol triacrylate, pentaerythritol tetraacrylate, dipentaerythritol tetraacrylate, dipentaerythritol pentaacrylate and/or dipentaerythritol hexaacrylate.

The lacquer composition preferably contains 10 to 60 parts by wt., particularly preferably 15 to 55 parts by wt. of component IV). The parts by weight mentioned are the sum of the parts by weight of all the mono-, di- or triacrylates or -methacrylates from which component IV) is composed.

The monoacrylates or -methacrylates for component IV) can be optionally substituted aliphatic, cycloaliphatic, aromatic or mixed aromatic-aliphatic monoacrylates or -methacrylates. In this context, both linear and branched aliphatic monoacrylates or -methacrylates, in which the alkyl chain can furthermore be interrupted by one or more hetero atoms, such as e.g. oxygen atoms, are possible. In the case of the cycloaliphatic or aromatic monoacrylates or -methacrylates, heterocyclic or heteroaromatic monoacrylates or -methacrylates are also possible. The possible monoacrylates or -methacrylates for component IV) are not alkoxylated.

Examples of such monoacrylates or -methacrylates are methyl acrylate, ethyl acrylate, n-butyl acrylate, isobutyl acrylate, t-butyl acrylate, 2-ethylhexyl acrylate, isodecyl acrylate, n-lauryl acrylate, $C_{12}$-$C_{15}$-alkyl acrylates, n-stearyl acrylate, n-butoxyethyl acrylate, butoxy-diethylene glycol acrylate, methoxy-triethylene glycol acrylate, cyclohexyl acrylate, tetrahydrofurfuryl acrylate, benzyl acrylate, 2-phenoxyethyl acrylate, isobornyl acrylate, 2-hydroxyethyl acrylate, 2-hydroxypropyl acrylate, 2-hydroxyethyl acrylate, 2-hydroxybutyl acrylate and the corresponding methacrylates.

The diacrylates or -methacrylates for component IV) can be, for example, those which differ from the diol diacrylates and -methacrylate of component I) and are not alkoxylated.

Examples of such diacrylates or -methacrylates are methanediol diacrylate, methanediol dimethacrylate, glycerol diacrylate, glycerol dimethacrylate, neopentyl glycol diacrylate, neopentyl glycol dimethacrylate, 2-butyl-2-ethyl-1,3-propanediol diacrylate, 2-butyl-2-ethyl-1,3-propanediol dimethacrylate, trimethylolpropane diacrylate or trimethylolpropane dimethacrylate.

The triacrylates or -methacrylates for component IV) can be, for example, those which differ from the triacrylates and -methacrylates of component III) and are not alkoxylated.

Examples of such triacrylates or -methacrylates glycerol triacrylate, glycerol trimethacrylate, 1,2,4-butanetriol triacrylate, 1,2,4-butanetriol trimethacrylate, trimethylolpropane triacrylate, trimethylolpropane trimethacrylate, tricyclodecanedimethanol diacrylate, tricyclodecanedimethanol dimethacrylate, ditrimethylolpropane tetraacrylate or ditrimethylolpropane tetramethacrylate.

Component IV) preferably contains at least one di- or triacrylate or at least one di- or trimethacrylate. Component IV) particularly preferably contains at least one triacrylate or -methacrylate. Particularly preferably, component IV) contains trimethylolpropane triacrylate and/or trimethylolpropane trimethacrylate, preferably trimethylolpropane triacrylate.

Suitable photoinitiators (UV-driven initiators) preferably have a high photochemical reactivity and an absorption band in the near UV range (>300 nm and particularly preferably >350 nm).

Suitable photoinitiators are preferably those chosen from the group of acylphosphine oxide derivatives, α-aminoalkylphenone derivatives, hydroxyalkylphenones, benzophenones, benzil ketals, methyl benzoylformate and phenylacetophenones.

Examples of such photoinitiators are benzophenone, bis(2,4,6-trimethylbenzoyl)phenylphosphine oxide (Irgacure® 819 from Ciba Specialty Chemicals), 1-hydroxy-cyclohexyl phenyl ketone (Irgacure® 184 from Ciba Specialty Chemicals), 2-benzyl-2-(dimethylamino)-1-(4-morpholinophenyl)-1-butanone (Irgacure® 369 from Ciba Specialty Chemicals), 2-methyl-1-[4-(methylthio)phenyl]-2-morpholino-1-propanone (Irgacure® 907 from Ciba Specialty Chemicals), (1-hydroxycyclohexyl)phenylmethanone (Irgacure® 1800 from Ciba Specialty Chemicals), 2-hydroxy-2-methyl-1-phenyl-1-propanone (Irgacure® 1700 from Ciba Specialty Chemicals), bis(2,6-dimethylbenzoyl)(2,4,4-trimethylpentyl)phosphine oxide, bis(2,6-dimethoxybenzoyl)(2,4,4-trimethylpentyl)phosphine oxide, (2,4,6-trimethylbenzoyl)diphenylphosphine oxide (Lucirin® TPO Solid from BASF AG), 2,4,6-trimethylbenzoylethoxyphenylphosphine oxide (Lucirin® TPO-L from BASF AG), benzoylphosphonic acid bis(2,6-dimethylphenyl)ester (Lucirin® 8728 from BASF AG) and 2-hydroxy-2-methyl-1-phenyl-1-propanone (Darocur® 4265 from Ciba Specialty Chemicals).

Mixtures of these photoinitiators with one another are likewise suitable.

The lacquer composition can furthermore optionally contain one or more further lacquer additives beyond the 100 parts by wt, of components I) to IV). Such lacquer additives can be chosen, for example, from the group containing stabilizers, flow agents, surface additives, pigments, dyestuffs, inorganic nanoparticles, adhesion promoters, IR absorbers and UV absorbers, preferably from the group containing stabilizers, flow agents, surface additives and inorganic nanoparticles. The lacquer composition preferably contains, in addition to the amount of the photoinitiator and in addition to the 100 parts by wt. of components I) to IV), 0 to 20 parts by wt., particularly preferably 0 to 10 parts by wt., very particularly preferably 0.1 to 10 parts by wt. of at least one further lacquer additive as component VI). Preferably, the total content of all the lacquer additives contained in the lacquer composition is 0 to 20 parts by wt., particularly preferably 0 to 10 parts by wt., very particularly preferably 0.1 to 10 parts by wt.

The lacquer composition can contain inorganic nanoparticles to increase the mechanical resistance, such as e.g. scratch resistance and/or pencil hardness, and for protection from UV radiation.

Possible nanoparticles are inorganic oxides, mixed oxides, hydroxides, sulfates, carbonates, carbides, borides and nitrides of elements of main group II to IV and/or element of subgroup I to VIII of the periodic table, including the lanthanides. Preferred nanoparticles are silicon oxide, aluminium oxide, cerium oxide, zirconium oxide, niobium oxide, zinc oxide or titanium oxide nanoparticles, and silicon oxide nanoparticles are particularly preferred.

The particles employed preferably have average particles sizes (measured by means of dynamic light scattering in dispersion, determined as the Z-mean), of less than 200 nm, preferably of from 5 to 100 nm, particularly preferably 5 to 50 nm. Preferably, at least 75%, particularly preferably at least 90%, very particularly preferably at least 95% of all the nanoparticles employed have the sizes defined above.

The lacquer composition can furthermore optionally contain one or more organic solvents beyond the 100 parts by wt. of components I) to IV). Such organic solvents can be chosen, for example, from the group containing aromatic solvents, such as e.g. xylene or toluene, ketones, such as e.g. acetone, 2-butanone, methyl isobutyl ketone, diacetone alcohol, alcohols, such as e.g. methanol, ethanol, i-propanol, 2-methoxypropyl alcohol, ethers, such as e.g. 1,4-dioxane, ethylene glycol n-propyl ether, or esters, such as e.g. ethyl acetate, butyl acetate, 1-methoxy-2-propyl acetate or mixture containing these solvents. i-Propanol, ethyl acetate, butyl acetate, 2-methoxy-propyl alcohol, xylene or toluene are particularly preferred. The lacquer composition preferably contains, in addition to the amount of the photoinitiator and in addition to the 100 parts by wt. of components I) to IV), 0 to 300 parts by wt., particularly preferably 0 to 200 parts by wt., very particularly preferably 10 to 150 parts by wt. of at least one organic solvent as component VII). Preferably, the total content of all the organic solvents contained in the lacquer composition is 0 to 300 parts by wt., particularly preferably 0 to 200 parts by wt., very particularly preferably 10 to 150 parts by wt.

The lacquer composition can furthermore optionally contain one or more laser-sensitive additives beyond the 100 parts by wt. of components I) to IV). Possible suitable laser-sensitive additives are those mentioned for the layers of plastic later in this application. The laser-sensitive additives can be preferably be added to the lacquer composition in an amount such that the completely or partly cured scratch-resistant coating contains 10 to 250 ppm, particularly preferably 15 to 150 ppm of laser-sensitive additive, based on the total weight of the completely or partly cured coating (without any solvent).

The lacquer compositions can be prepared in a simple manner either by bringing together the individual components I) to V) and optionally the optional components VI) and VII) in the absence of solvent(s) and mixing them with one another by stirring, or, in the presence of solvents, for example by adding them to the solvent or solvents and mixing them with one another by stirring. Preferably, the photoinitiator is first dissolved in the solvent or solvents or, for example, in component I) and the further components are then added. A purification by means of filtration, preferably by means of fine filtration, is then optionally also carried out.

Scratch-resistant coatings can be produced from the lacquer compositions in a simple manner by applying the lacquer compositions to appropriate substrates by the usual processes and thereafter curing them under suitable conditions. In this context, for example, one or more layers of the lacquer composition can be applied to the appropriate optionally pre-treated substrate, at least some of the solvent optionally present can then be removed from the layer(s) and the layer(s) obtained in this way can then be cured. In this context, in the case of application of several layers from the lacquer composition, the removal of at least some of the solvent optionally present is carried out in each case before the application of the next layer. Curing of the particular layer(s) can also optionally be carried out in each case before application of the next layer.

The application can be carried out, for example, by dipping, flooding, spraying, knife coating, pouring, spin-coating or brushing. On a large industrial scale, the application can be carried out, for example, in a roll-to-roll process by spraying, knife coating, pouring or rolling. All or some of the solvent optionally present is then removed, preferably evaporated off, and the coating obtained in this way is preferably cured by means of UV radiation. Information on the application by the usual methods is to be found, for example, in Organic Coatings: Science and Technology, John Wiley & Sons 1994, chapter 22, pages 417-432.

A thermoplastic film serves as the substrate for the production of the thermoplastic film according to the invention with such a scratch-resistant coating. Possible thermoplastic films are, according to the invention, those films comprising at least one layer containing at least one thermoplastic. However, it is also possible to apply the scratch-resistant coating to other substrates, such as e.g. a ready-made card blank or a prefabricated multi-layer construction. It is preferable, however, to apply the scratch-resistant coating to a thermoplastic film, since this can be employed in the process according to the invention. Such a thermoplastic film can be a single- or multi-layer thermoplastic film. In the case of a multi-layer thermoplastic film as the substrate, this can be a thermoplastic film produced by means of co-extrusion, extrusion lamination or lamination, preferably by means of co-extrusion.

The thermoplastic film according to the invention preferably has a thickness of from 20 μm to 500 μm, particularly preferably from 25 to 300 μm, very particularly preferably from 30 to 250 μm. In preferred embodiments, the thermoplastic film according to the invention has a thickness of from 50 to 150 μm.

The thermoplastic film according to the invention preferably has a base peak-to-valley height $R_{3z}$ of from 1 to 20 μm, preferably 3 to 20 μm, on the side which is not coated with the scratch-resistant coating. The base peak-to-valley height $R_{3z}$ is the arithmetic means of 5 individual peak-to-valley heights $R_{3z1}$ to $R_{3z5}$, the individual peak-to-valley height being defined as the vertical distance between the third highest profile peak and the third lowest profile valley within the individual measurement zone $L_e$. The base peak-to-valley height $R_{3z}$ is measured over a measurement length of $L_m$=12.5 mm and an individual measurement zone $L_e$ of 2.5 mm. The measurements can be carried out in accordance with the Daimler Benz Works Standard N31007 of 1983.

It is also possible for the thermoplastic film according to the invention optionally to have a layer of adhesive on the side which is not coated with the scratch-resistant coating. For coatings of adhesive, for example, those based on polyurethane or acrylate adhesives are suitable. Such adhesives are known to the person skilled in the art.

In the case where the thermoplastic film according to the invention optionally has a layer of adhesive on the side which is not coated with the scratch-resistant coating, it is preferable to use a latent reactive adhesive. Latent reactive adhesives are known to the person skilled in the art. Preferred latent reactive adhesives are those which comprise an aqueous dispersion and which contain a di- or polyisocyanate with a melting or softening temperature of >30° C. and a polymer which is reactive with isocyanate. Preferably, such an aqueous dispersion has a viscosity of at least 2,000 mPas. Preferably, furthermore, the isocyanate-reactive polymers in this dispersion is a polyurethane which is built up from crystallizing polymer chains which, when measured by means of thermomechanical analysis (TMA), partly or completely decrystallize at temperatures below +110° C., preferably at temperatures below +90° C. The measurement by means of TMA is carried out analogously to ISO 11359 Part 3 "Determination of the penetration temperature". Preferably, furthermore, the di- or polyisocyanate is one chosen from the groups of dimerization products, trimerization products and urea derivatives of TDI (toluoylene-diisocyanate) or IPDI (isophorone-diisocyanate). Such latent reactive adhesives are described, for example, in DE-A 10 2007 054 046. By using such latent reactive adhesives, an additional increase in the forgery security of the security and/or valuable document is effected in that water vapour and/or air can no longer diffuse into the inside via the edges of the layer construction and thus can no longer lead to a subsequent delamination. Such layer constructions can no longer be separated without destruction.

The security and/or valuable document according to the invention preferably has at least one scratch-resistant coating produced from the lacquer composition on both sides.

For this, in the production according to the invention of such a security and/or valuable document, for the production of two outer layers of the security and/or valuable document which are provided with a scratch-resistant finish, the film stack comprises at least two thermoplastic films each with a side which is provided with a scratch-resistant coating and is facing outwards.

Preferably, at least one item of information, preferably at least one item of information in the micrometer scale, is impressed in at least one of the scratch-resistant coating(s) of the security and/or valuable document according to the invention. As a result, additional security features can be incorporated into the security and/or valuable document according to the invention.

In the context of the invention, the term item of information includes any item of information which can be imaged—and in the case of an impressed item of information can also be impressed—in any form. This can be, for example, individual numbers, combinations of numbers, individual letters, combinations of letters, words, signatures, symbols, recurring patterns, line structures, ornaments, pictures or other images and combinations of these.

In the production according to the invention of such a security and/or valuable document, the such item(s) of information would optionally be impressed in at least one outer layer, which has been provided with a scratch-resistant finish, during or after the lamination, preferably directly during the lamination of the film stack.

The lacquer composition offers the advantage that scratch-resistant coatings produced therefrom withstand the high lamination temperatures during production of security and/or valuable documents, preferably ID cards, without thereby sticking to the die or being destroyed or impaired in their properties. Conventional lamination conditions of such security and/or valuable documents, preferably ID cards, are, for example, lamination temperatures of from 100 to 200° C., preferably from 120 to 190° C., and laminating pressures of up to 380 N/cm$^2$, preferably between 200 and 350 N/cm$^2$ during the lamination.

The scratch-resistant coatings produced with the lacquer composition preferably have layer thicknesses (dry film thicknesses) of between 1 and 25 µm, particularly preferably between 1 and 15 µm, very particularly preferably between 2 and 10 µm.

Preferably, the security and/or valuable document according to the invention is an identification document, preferably an ID card (identity card), such as e.g. a personal identity card, passport, driving license, a bank card, credit card, insurance card, other identity card etc.

The security and/or valuable document according to the invention preferably comprises further layers of plastic, particularly preferably layers of thermoplastic containing at least one thermoplastic.

The security and/or valuable document according to the invention or the film of plastic according to the invention, preferably the security and/or valuable document according to the invention, can comprise at least one layer of plastic, particularly preferably layer of thermoplastic, with a filler content. The layer or layers of plastic with a filler content can preferably in each case be independently of each other a translucent, white, black or coloured layer with a filler content of fillers. Particularly preferably, the layers of plastic with a filler content independently of each other are translucent or white layers with a filler content. Such translucent or white-coloured layers of plastic with a filler content preferably contain titanium dioxide, zirconium dioxide, barium sulfate or glass fibres as pigments and/or fillers. Possible suitable layers of plastic with a filler content are furthermore those of Teslin®.

Preferably, the layers of plastic with a filler content are those with a transmission in the visible wavelength range of from 380 nm to 780 nm of less than 50%, preferably of less than 35%, particularly preferably of less than 25%, in very particularly preferred embodiments of less than 15%.

In preferred embodiments of the present invention, the security and/or valuable document according to the invention or the film of plastic according to the invention, preferably the security and/or valuable document according to the invention, comprises at least one layer of plastic, particularly preferably layer of thermoplastic, which contains laser-sensitive additives.

Possible laser-sensitive additives are, for example, so-called laser marking additives, i.e. those of an absorber in the wavelength range of the laser to be used, preferably in the wavelength range of ND:YAG lasers (neodymium-doped yttrium-aluminium-garnet lasers). Such laser marking additives and the use thereof in moulding compositions are described, for example, in WO-A 2004/50766 and WO-A 2004/50767 and are available commercially from DSM under the brand name Micabs®. Absorbers which are furthermore suitable as laser-sensitive additives are carbon black, coated laminar silicates, as described e.g. in DE-A-195 22 397 and commercially obtainable under the brand name Lazerflair®, antimony-doped tin oxide, as described e.g. in U.S. Pat. No. 6,693,657 and commercially obtainable under the brand name Mark-It™, and phosphorus-containing tin/copper mixed oxides, as described e.g. in WO-A 2006/042714. It is preferable for the particle size of the laser-sensitive additive to be in the range of from 100 nm to 10 μm, and particularly advantageous for it to be in the range of from 500 nm to 2 μm. A very particularly preferred laser-sensitive additive is carbon black.

The security and/or valuable document according to the invention or the film of plastic according to the invention, preferably the security and/or valuable document according to the invention, can have one or more further additional layer(s), preferably layers of plastic, particularly preferably layers of thermoplastic, via which, for example, further items of information are incorporated into the security and/or valuable document, preferably identification document. Such items of information can have been applied to one or more constituents, such as e.g. films, employed for production of the document, for example by means of at least one process chosen from printing processes, such as e.g. screen, ink-jet, offset or laser printing processes etc., or engraving processes, such as e.g. laser engraving, or coating processes, such as e.g. knife coating, dipping etc., optionally with the aid of the mask technique etc. The items of information can preferably be of a decorative nature or individualizing nature, such as e.g. names, addresses, photos etc.

The multi-layer construction according to the invention can have one or more further additional layer(s), preferably layers of plastic, which serve e.g. for protection of the security and/or valuable document. These can be e.g. layers provided with an antistatic finish and/or IR-reflecting finish.

The film of plastic according to the invention can also be provided with an antistatic finish and/or IR-reflecting finish.

The layers present according to the invention in addition to the scratch-resistant coatings produced from the lacquer composition, preferably layers of plastic, particularly preferably layers of thermoplastic, preferably each have a thickness of 20 μm to 850 μm, it being possible for the individual layers of plastic to have the same or different layer thicknesses. Layer thicknesses of from 25 to 500 μm are preferred, particularly preferably from 30 to 300 μm, very particularly preferably from 50 to 250 μm.

The layers of plastic contained in the security and/or valuable document according to the invention or in the film of plastic according to the invention, particularly preferably layers of thermoplastic, preferably contain at least one thermoplastic.

Possible thermoplastics for the layers of plastic independently of each other are thermoplastics chosen from polymers of ethylenically unsaturated monomers and/or polycondensates of bifunctional reactive compounds. For certain uses, it may be advantageous to employ a transparent thermoplastic. In particularly preferred embodiments, the layers of plastic mentioned can unanimously contain at least one thermoplastic chosen from the abovementioned groups.

Particularly suitable thermoplastics are polycarbonates or copolycarbonates based on diphenols, poly- or copolyacrylates and poly- or copolymethacrylates, such as, by way of example and preferably, polymethyl methacrylate, poly- or copolymers with styrene, such as, by way of example and preferably, transparent polystyrene or polystyrene/acrylonitrile (SAN), transparent thermoplastic polyurethanes, and polyolefins, such as, by way of examples and preferably, transparent polypropylene types or polyolefins based on cyclic olefins (e.g. TOPAS®, Hoechst) or polyolefin-based materials, such as e.g. Teslin®, poly- or copolycondensates of terephthalic acid, such as, by way of example and preferably, poly- or copolyethylene terephthalate (PET or CoPET), gly-col-modified PET (PETG) or poly- or copolybutylene terephthalate (PBT or CoPBT) or mixtures of the above-mentioned.

Polycarbonates or copolycarbonates, in particular with average molecular weights $M_w$ of from 500 to 100,000, preferably from 10,000 to 80,000, particularly preferably from 15,000 to 40,000, or blends containing at least one such polycarbonate or copolycarbonate are very particularly preferred. Blends of the abovementioned polycarbonates or copolycarbonates with at least one poly- or copolycondensate of terephthalic acid, in particular at least one such poly- or copolycondensate of terephthalic acid with average molecular weights $M_w$ of from 10,000 to 200,000, preferably from 26,000 to 120,000, are furthermore also preferred. In particularly preferred embodiments of the invention, the blend is a blend of polycarbonate or copolycarbonate with poly- or copolybutylene terephthalate. Such a blend of polycarbonate or copolycarbonate with poly- or copolybutylene terephthalate can preferably be one with 1 to 90 wt. % of polycarbonate or copolycarbonate and 99 to 10 wt. % of poly- or copolybutylene terephthalate, preferably with 1 to 90 wt. % of polycarbonate and 99 to 10 wt. % of polybutylene terephthalate, the contents adding up to 100 wt. %. Such a blend of polycarbonate or copolycarbonate with poly- or copolybutylene terephthalate can particularly preferably be one with 20 to 85 wt. % of polycarbonate or copolycarbonate and 80 to 15 wt. % of poly- or copolybutylene terephthalate, preferably with 20 to 85 wt. % of polycarbonate and 80 to 15 wt. % of polybutylene terephthalate, the contents adding up to 100 wt. %. Such a blend of polycarbonate or copolycarbonate with poly- or copolybutylene terephthalate can very particularly preferably be one with 35 to 80 wt. % of polycarbonate or copolycarbonate and 65 to 20 wt. % of poly- or copolybutylene terephthalate, preferably with 35 to 80 wt. % of polycarbonate and 65 to 20 wt. % of polybutylene terephthalate, the contents adding up to 100 wt. %.

In preferred embodiments, particularly suitable polycarbonates or copolycarbonates are aromatic polycarbonates or copolycarbonates.

The polycarbonates or copolycarbonates can be linear or branched in a known manner.

The preparation of these polycarbonates can be carried out in a known manner from diphenols, carbonic acid derivatives, optionally chain terminators and optionally branching agents. Details of the preparation of polycarbonates have been laid down in many patent specifications for about 40 years. Reference may be made here by way of example merely to Schnell, "Chemistry and Physics of Polycarbonates", Polymer Reviews, volume 9, Interscience Publishers, New York, London, Sydney 1964, to D. Freitag, U. Grigo, P. R. Müller, H. Nouvertne', BAYER AG, "Polycarbonates" in Encyclopedia of Polymer Science and Engineering, volume 11, second edition, 1988, pages 648-718 and finally to Dres. U. Grigo, K. Kirchner and P. R. Müller "Polycarbonate" in Becker/Braun, Kunststoff-Handbuch, volume 3/1, Polycarbonate, Polyacetale, Polyester, Celluloseester, Carl Hanser Verlag Munich, Vienna 1992, pages 117-299.

Suitable diphenols can be, for example, dihydroxyaryl compounds of the general formula (III) wherein Z is an aromatic radical having 6 to 34 C atoms, which can contain one or more optionally substituted aromatic nuclei and aliphatic or cycloaliphatic radicals or alkylaryls or hetero atoms as bridge members.

Particularly preferred dihydroxyaryl compounds are resorcinol, 4,4'-dihydroxydiphenyl, bis-(4-hydroxyphenyl)-diphenyl-methane, 1,1-bis-(4-hydroxyphenyl)-1-phenyl-ethane, bis-(4-hydroxyphenyl)-1-(1-naphthyl)-ethane, bis-(4-hydroxyphenyl)-1-(2-naphthyl)-ethane, 2,2-bis-(4- hydroxyphenyl)-propane, 2,2-bis(3,5-dimethyl-4-hydroxyphenyl)-propane, 1,1-bis-(4-hydroxyphenyl)-cyclohexane, 1,1-bis-(3,5-dimethyl-4-hydroxyphenyl)-cyclohexane, 1,1-bis-(4-hydroxyphenyl)-3,3,5-trimethyl-cyclohexane, 1,1'-bis-(4-hydroxyphenyl)-3-diisopropyl-benzene and 1,1'-bis-(4-hydroxyphenyl)-4-diisopropyl-benzene.

Very particularly preferred dihydroxyaryl compounds are 4,4'-dihydroxydiphenyl, 2,2-bis-(4-hydroxyphenyl)-propane and bis-(4-hydroxyphenyl)-3,3,5-trimethyl-cyclohexane.

A very particularly preferred copolycarbonate can be prepared using 1,1-bis-(4-hydroxyphenyl)-3,3,5-trimethyl-cyclohexane and 2,2-bis-(4-hydroxyphenyl)-propane.

Suitable carbonic acid derivatives can be, for example, diaryl carbonates of the general formula (IV)

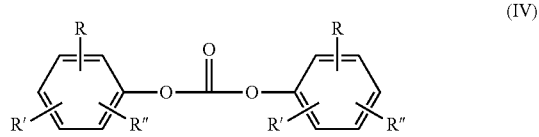

(IV)

wherein
R, R' and R'' independently of each another are identical or different and represent hydrogen, linear or branched $C_1$-$C_{34}$-alkyl, $C_7$-$C_{34}$-alkylaryl or $C_6$-$C_{34}$-aryl, and R can furthermore also denote —COO—R''', wherein R''' represents hydrogen, linear or branched $C_1$-$C_{34}$-alkyl, $C_7$-$C_{34}$-alkylaryl or $C_6$-$C_{34}$-aryl.

Particularly preferred diaryl compounds are diphenyl carbonate, 4-tert-butylphenyl phenyl carbonate, di-(4-tert-butylphenyl)carbonate, biphenyl-4-yl phenyl carbonate, di-(biphenyl-4-yl) carbonate, 4-(1-methyl-1-phenylethyl)-phenyl phenyl carbonate, di-[4-(1-methyl-1-phenylethyl)-phenyl] carbonate and di-(methyl salicylate) carbonate.

Diphenyl carbonate is very particularly preferred.

Either one diaryl carbonate or different diaryl carbonates can be used

One or more monohydroxyaryl compound(s) which has/have not been used for the preparation of the diaryl carbonate(s) used can additionally be employed, for example, as chain terminators to control or vary the end groups. These can be those of the general formula (V)

(V)

wherein
$R^A$ represents linear or branched $C_1$-$C_{34}$-alkyl, $C_7$-$C_{34}$-alkylaryl, $C_6$-$C_{34}$-aryl or —COO—$R^D$, wherein $R^D$ represents hydrogen, linear or branched $C_1$-$C_{34}$-alkyl, $C_7$-$C_{34}$-alkylaryl or $C_6$-$C_{34}$-aryl, and
$R^B$, $R^C$ independently of each other are identical or different and represent hydrogen, linear or branched $C_1$-$C_{34}$-alkyl, $C_7$-$C_{34}$-alkylaryl or $C_6$-$C_{34}$-aryl.

4-tert-Butylphenol, 4-iso-octylphenol and 3-pentadecylphenol are preferred.

Suitable branching agents can be compounds with three and more functional groups, preferably those with three or more hydroxyl groups.

Preferred branching agents are 3,3-bis-(3-methyl-4-hydroxyphenyl)-2-oxo-2,3-dihydroindole and 1,1,1-tris-(4-hydroxyphenyl)-ethane.

In preferred embodiments of the invention, suitable poly- or copolycondensates of terephthalic acid are polyalkylene terephthalates. Suitable polyalkylene terephthalates are, for example, reaction products of aromatic dicarboxylic acids or their reactive derivatives (e.g. dimethyl esters or anhydrides) and aliphatic, cycloaliphatic or araliphatic diols and mixtures of these reaction products.

Preferred polyalkylene terephthalates can be prepared from terephthalic acid (or its reactive derivatives) and aliphatic or cycloaliphatic diols having 2 to 10 C atoms by known methods (Kunststoff-Handbuch, vol. VIII, p. 695 et seq., Karl-Hanser-Verlag, Munich 1973).

Preferred polyalkylene terephthalates contain at least 80 mol %, preferably 90 mol % of terephthalic acid radicals, based on the dicarboxylic acid component, and at least 80 mol %, preferably at least 90 mol % of radicals of ethylene glycol and/or butane-1,4-diol, based on the diol component.

The preferred polyalkylene terephthalates can contain, in addition to terephthalic acid radicals, up to 20 mol % of radicals of other aromatic dicarboxylic acids having 8 to 14 C atoms or aliphatic dicarboxylic acids having 4 to 12 C atoms, such as, for example, radicals of phthalic acid, isophthalic acid, naphthalene-2,6-dicarboxylic acid, 4,4'-diphenyldicarboxylic acid, succinic, adipic, sebacic acid, azelaic acid, cyclohexanediacetic acid.

The preferred polyalkylene terephthalates can contain, in addition to radicals of ethylene glycol or butane-1,4-diol, up to 20 mol % of other aliphatic diols having 3 to 12 C atoms or cycloaliphatic diols having 6 to 21 C atoms, e.g. radicals of propane-1,3-diol, 2-ethylpropane-1,3-diol, neopentyl glycol, pentane-1,5-diol, hexane-1,6-diol, cyclohexane-1,4-dimethanol, 3-methylpentane-2,4-diol, 2-methylpentane-2,4-diol, 2,2,4-trimethylpentane-1,3-diol, and 2-ethylhexane-1,6-diol, 2,2-diethylpropane-1,3-diol, hexane-2,5-diol, 1,4-di-([beta]-hydroxyethoxy)-benzene, 2,2-bis-(4-hydroxycyclohexyl)-propane, 2,4-dihydroxy-1,1,3,3-tetramethyl-cyclobutane, 2,2-bis-(4-[beta]-hydroxyethoxyphenyl)-propane and 2,2-bis-(4-hydroxypropoxyphenyl)-propane (cf. DE-OS 24 07 674, 24 07 776, 27 15 932).

The polyalkylene terephthalates can be branched by incorporation of relatively small amounts of 3- or 4-hydric alcohols or 3- or 4-basic carboxylic acids, such as are described e.g. in DE-OS 19 00 270 and U.S. Pat. No. 3,692,744. Examples of preferred branching agents are trimesic acid, trimellitic acid, trimethylolethane and -propane and pentaerythritol.

Preferably, not more than 1 mol % of the branching agent, based on the acid component, is used.

Polyalkylene terephthalates which have been prepared solely from terephthalic acid and reactive derivatives thereof (e.g. dialkyl esters thereof) and ethylene glycol and/or butane-1,4-diol, and mixtures of these polyalkylene terephthalates are particularly preferred.

Preferred polyalkylene terephthalates are also copolyesters which are prepared from at least two of the abovementioned acid components and/or from at least two of the abovementioned alcohol components, and particularly preferred copolyesters are poly(ethylene glycol/butane-1,4-diol) terephthalates.

The polyalkylene terephthalates preferably used as the component preferably have an intrinsic viscosity of from approx. 0.4 to 1.5 dl/g, preferably 0.5 to 1.3 dl/g, in each case measured in phenol/o-dichlorobenzene (1:1 parts by wt.) at 25° C.

In a particularly preferred embodiment of the present invention, as many as possible of the layers of thermoplastic present contain at least one polycarbonate or copolycarbonate.

The security and/or valuable document according to the invention or the film of plastic according to the invention, preferably the security and/or valuable document according to the invention, can comprise a monolithic laminated composite in the regions in which the layers of plastic have direct contact with one another. Such a monolithic laminated composite offers particular protection from subsequent non-destructive separation of the laminated composite.

In the case where the plastics of the individual layers of plastic are the same or similar plastics or mixtures of plastics, in particular in the case of a monolithic laminated composite, individual layers are to be understood as meaning the parts of the laminated composite which have contributed to the laminated composite in the production of the multi-layer composite (e.g. in the form of the security and/or valuable document according to the invention) from various components, e.g. various films.

The security and/or valuable document according to the invention can furthermore comprise one or more electronic components.

The following embodiment examples serve to explain the invention by way of example, but should in no way be construed to limit the invention.

EXAMPLES

Abbreviations and Trade Names Used:
HDDA 1,6-Hexanediol diacrylate
PTTA Pentaerythritol tetraacrylate
TMPTA Trimethylolpropane triacrylate
HDI 1,6-Hexamethylene diisocyanate
PTTA/HDI Reaction product of PTTA and HDI
Irgacure® 184 1-Hydroxy-cyclohexyl phenyl ketone (photoinitiator from Ciba Specialty Chemicals)
BYK® 306 Solution of a polyether-modified polydimethylsiloxane in a xylene/monophenyl glycol mixture (mixing ratio 7/2), solids content 12.5 wt. % (wetting auxiliary from BYK Additives & Instruments)
Components I) to IV) Used:

| Component I) | HDDA |
|---|---|
| Component II) | Ethoxylated TMPTA with a molecular weight of weight-average molecular weight of $M_w$ approx. 500 g/mol (determined via GPC against polystyrene as the standard) |
| Component III) | PTTA (for Examples 1 to 7 and Comparison Examples 1 to 4) |
| Component IV) | TMPTA |
| Component III) | PTTA/HDI (for Example 8) |

Examples 1 to 8

According to the Invention

Comparison Examples 1 to 4

Preparation of the Lacquer Compositions

In accordance with the compositions described in Tab. 1a and 1b, the stated parts by wt. of HDDA were initially introduced into the mixing vessel and 7 parts by wt. of the photoinitiator Irgacure® 184 were added. The mixture was stirred until the photoinitiator was dissolved. Thereafter, the photoinitiator solution was subjected to fine filtration (filter with a pore width of 1 μm). The other monomers (TMPTA, ethoxylated TMPTA, PTTA or PTTA reaction product with HDI) in accordance with the stated parts by wt. and additionally 0.9 part by wt. of BYK® 306 were then added in succession, while stirring, and the mixture was subsequently stirred for 15 minutes. The lacquer was subjected to fine filtration (filter with a pore width of 1 μm) once more.

TABLE 1a

| Component | Example 1 | Example 2 | Comparison Example 1 | Comparison Example 2 | Example 3 | Example 4 |
|---|---|---|---|---|---|---|
| HDDA[1] | 19.5 | 48.8 | 73.8 | 11.9 | 25.3 | 24.2 |
| TMPTA[1] | 33.0 | 20.7 | 10.5 | 36.0 | 30.4 | 16.7 |
| Ethoxylated TMPTA[1] | 20.5 | 20.7 | 10.5 | 22.5 | 19.0 | 25.5 |
| PTTA[1] | 27.0 | 9.8 | 5.2 | 29.6 | 25.3 | 33.6 |
| Σ parts by wt. | 100 | 100 | 100 | 100 | 100 | 100 |

[1]Data in parts by wt.

TABLE 1b

| Component | Example 5 | Comparison Example 3 | Example 6 | Example 7 | Comparison Example 4 | Example 8 |
|---|---|---|---|---|---|---|
| HDDA[1] | 15.3 | 21.8 | 18.0 | 18.2 | 14.2 | 24.9 |
| TMPTA[1] | 47.5 | 36.9 | 30.4 | 30.7 | 24.0 | 29.8 |
| Ethoxylated TMPTA[1] | 16.1 | 11.1 | 26.6 | 19.1 | 14.9 | 18.4 |
| PTTA[1] | 21.1 | 30.2 | 25.0 | 32.0 | 46.9 | 26.9 |
| Σ parts by wt. | 100 | 100 | 100 | 100 | 100 | 100 |

[1]Data in parts by wt.

Production of the Coated Films:

Using the lacquer compositions obtained in this way, polycarbonate films of Makrofol® DE 1-1 in DIN A4 size and with a thickness of 175 μm were coated with the particular lacquer composition with a wet film thickness of 5 μm (corresponds to a dry film thickness of approx. 5 μm) by means of a doctor blade. The coated films were then cured in a UV unit (from ssr engineering gmbh, BS 407 dr conveyor with Hg vapour lamp) with a UV dose of 350 mJ/cm$^2$ (Lightbug ILT 490).

Production of the Laminated Cards:

Two white-pigmented polycarbonate films of Makrofol® ID 4-4 010207 in DIN A4 size with a thickness of 250 μm were laid between two films according to the invention coated with the same lacquer composition. In this case, the films according to the invention were arranged with the coating on the outside. The film stack was laid in a laminating press from Bürkle and laminated under pressure and heat. Lamination was carried out with the following parameters:
Temperature: 175° C.
Low pre-pressure during the heating-up time: 15 N/cm$^2$
Heating up time: 8 minutes.
High pressure during the lamination: 300 N/cm$^2$
Laminating time: 2 minutes.

Cooling of the press was then started. Cooling was carried out while maintaining the pressure loading. When a temperature of 38° C. was reached, the press opened.

Cards which had the dimensions of a card according to ISO 7810 were stamped out of the laminated sheets.

Apart from the film stack produced with the film coated with the lacquer composition from Comparison Example 1, all the coated films showed good laminatability (cf. also Tab. 2a and 2b). The films coated with the lacquer composition from Comparison Example 1 were tacky after removal from the press and could not be further processed to cards.

In each one of the cards obtained, multiple laser image (MLI) and changeable laser image (CLI) structures were impressed on one of the surfaces under the same conditions as those used for the lamination. All the cards obtained could be impressed with these structures without the scratch-resistant coating present showing cracks (cf. also Tab. 2a and 2b).

The cards were first subjected to a manual bending test. In this context, the card is bent manually once in the middle along the flat transverse direction such that the two ends meet each other (bending through 180°). Of the cards which showed no or only partial cracks after this bending test, a further such card was subjected to a folding test in accordance with ISO 7810.

TABLE 2a

| Properties/Test | Example 1 | Example 2 | Comparison Example 1 | Comparison Example 2 | Example 3 | Example 4 |
|---|---|---|---|---|---|---|
| Laminatability (175° C.; 300 N/cm$^2$) | yes | yes | no | yes | yes | yes |
| Impressability (175° C.; 300 N/cm$^2$) | yes | yes | no | yes | yes | yes |
| Bending test (by hand, 180°) | no cracks | no cracks | — | continuous cracks | no cracks | only partial cracks |

TABLE 2b

| Properties/Test | Example 5 | Comparison Example 3 | Example 6 | Example 7 | Comparison Example 4 | Example 8 |
|---|---|---|---|---|---|---|
| Laminatability (175° C.; 300 N/cm$^2$) | yes | yes | yes | yes | yes | yes |
| Impressability (175° C.; 300 N/cm$^2$) | yes | yes | yes | yes | yes | yes |
| Bending test (by hand, 180°) | no cracks | continuous cracks | no cracks | only partial cracks | continuous cracks | no cracks |

After this test, all the cards according to the invention showed either no cracks at all or only partial cracks in the scratch-resistant coating, whereas the cards from the comparison examples already showed continuous cracks (cf. Tab. 2a and 2b).

Of the cards which showed no or only partial cracks after this bending test, a further such card was subjected to a folding test in accordance with ISO 7810. The card from Example 2 showed no cracking at all even after 20,000 folding sequences. The cards from Examples 3 and 4 showed only minimal cracks after 20,000 folding sequences. The cards from Example 1 and 7 showed cracks of a few mm in length after between 10,000 and 15,000 folding sequences. The cards from Example 5 and 6 showed cracks of a few mm in length after between 15,000 and 20,000 folding sequences. The card from Example 1 showed cracks of a few mm in length after between 10,000 and 15,000 folding sequences. No folding test was carried out for the card from Example 7 and 8. The results show that none of the cards according to the invention shows continuous cracks at 20,000 folding sequences. In some examples, only partial cracks were observed on a scale of only a few mm, so that the cards according to the invention all meet the requirements of the corresponding standard.

The resistances to solvents of the cards from Examples 1 to 8 and Comparison Examples 2 to 4 with respect to i-propanol, xylene, methoxypropyl acetate, ethyl acetate and acetone were furthermore determined by loading the cards with a textile impregnated with the solvent mentioned at 23° C. for one hour. None of the cards showed a visible change and after the test none of the cards could be damaged by scratching on the places loaded with the solvent.

The scratch resistance of the coatings was moreover tested by laying a piece of steel wool (type 00) on the coating of a laminated sheet, loading this with a hammer weighing 500 g and pulling it over a distance of 10 cm length 20 times, without thereby exerting additional pressure on the hammer. Thereafter, the gloss level and haze (measured in accordance with ISO 2813 and ISO 13803 with a micro-haze plus from BYK Additives & Instruments) of the coating treated in this way were measured. Only the coatings which were produced with the lacquer compositions according to Comparison Examples 2 and 3 showed visible traces of scratches.

The results show overall that the cards according to the invention both meet the high requirements of flexibility and breaking strength of such documents and have a good resistance to chemicals and scratch resistance. The films coated with the lacquer compositions according to the invention furthermore withstand the high laminations temperatures and can be impressed with fine μm structures without cracking. In contrast, the cards according to the comparison examples do not show an adequate flexibility and breaking strength and in some cases furthermore do not show an adequate scratch resistance.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

All references described herein are incorporated by reference for all useful purposes.

The invention claimed is:

1. A security and/or valuable document comprising a scratch-resistant coating obtained from a lacquer composition comprising
   I) from 12 to 70 parts by wt. of a $C_2$-$C_{12}$-diol diacrylate or $C_2$-$C_{12}$-diol dimethacrylate, wherein $C_2$-$C_{12}$ represents a linear alkylene radical which can be optionally substituted by a methyl group or can be interrupted by one or more oxygen atom(s) and optionally substituted by one or more methyl group(s),
   II) from 12 to 40 parts by wt. of an alkoxylated mono-, di-, tri-, tetra-, penta- or hexaacrylate or alkoxylated mono-, di-, tri-, tetra-, penta- or hexamethacrylate,
   III) from 0 to 40 parts by wt. of a monomer selected from the group consisting of pentaerythritol triacrylate, pentaerythritol tetraacrylate, dipentaerythritol tetraacrylate, dipentaerythritol pentaacrylate, dipentaerythritol hexaacrylate, pentaerythritol trimethacrylate, pentaerythritol tetramethacrylate, dipentaerythritol tetramethacrylate, dipentaerythritol pentamethacrylate, dipentaerythritol hexamethacrylate, reaction products thereof with aliphatic or aromatic diisocyanates, and mixtures thereof, IV) from 5 to 60 parts by wt. of a further mono-, di- or triacrylate or mono-, di- or trimethacrylate, wherein the parts by weight of components I) to IV) add up to 100 parts by wt., and, in addition to the 100 parts by wt., the lacquer composition further comprises V) from 0.1 to 10 parts by wt. of a photoinitiator.

2. The security and/or valuable document according to claim 1, wherein the lacquer composition comprises from 15 to 60 parts by wt of component I).

3. The security and/or valuable document according to claim 1, wherein the lacquer composition comprises from 12 to 35 parts by wt. of component II).

4. The security and/or valuable document according to claim 1, wherein the lacquer composition comprises from 0 to 30 parts by wt. of component III).

5. The security and/or valuable document according to claim 1, wherein the security and/or valuable document is an identification document.

6. The security and/or valuable document according to claim 1, wherein the security and/or valuable document comprises the scratch-resistant coating obtained from the lacquer composition on both sides of the security and/or valuable document.

7. The security and/or valuable document according to claim 1, wherein an item of information has been impressed in the scratch-resistant coating.

8. A process for the production of a lacquer composition for a scratch-resistant coating for a security and/or valuable document comprising contacting at least I) from 12 to 70 parts by wt. of a $C_2$-$C_{12}$-diol diacrylate or $C_2$-$C_{12}$-diol dimethacrylate, wherein $C_2$-$C_{12}$ represents a linear alkylene radical which can be optionally substituted by a methyl group or can be interrupted by one or more oxygen atom(s) and optionally substituted by one or more methyl group(s), II) from 12 to 40 parts by wt. of an alkoxylated mono-, di-, tri-, tetra-, penta- or hexaacrylate or alkoxylated mono-, di-, tri-, tetra-, penta- or hexamethacrylate, III) from 0 to 40 parts by wt. of a monomer selected from the group consisting of pentaerythritol triacrylate, pentaerythritol tetraacrylate, dipentaerythritol tetraacrylate, dipentaerythritol pentaacrylate, dipentaerythritol hexaacrylate, pentaerythritol trimethacrylate, pentaerythritol tetramethacrylate, dipentaerythritol tetramethacrylate, dipentaerythritol pentamethacrylate, dipentaerythritol hexamethacrylate, reaction products thereof with aliphatic or aromatic diisocyanates, and mixtures thereof IV) from 5 to 60 parts by wt. of a further mono-, di- or triacrylate or mono-, di- or trimethacrylate, wherein the parts by weight of components I) to IV) add up to 100 parts by wt., and, in addition to the 100 parts by wt., V) from 0.1 to 10 parts by wt. of at least one photoinitiator.

9. A process for the production of a security and/or valuable document comprising forming a film stack comprising a plurality of thermoplastic films, wherein at least one of the thermoplastic films has a first outwardly facing side having a scratch-resistant coating and laminating the film stack, wherein the scratch-resistant coating is obtained from a lacquer composition comprising I) from 12 to 70 parts by wt. of a $C_2$-$C_{12}$-diol diacrylate or $C_2$-$C_{12}$-diol dimethacrylate, wherein $C_2$-$C_{12}$ represents a linear alkylene radical which can be optionally substituted by a methyl group or can be interrupted by one or more oxygen atom(s) and optionally substituted by one or more methyl group(s), II) from 12 to 40 parts by wt. of an alkoxylated mono-, di-, tri-, tetra-, penta- or hexaacrylate or alkoxylated mono-, di-, tri-, tetra-, penta- or hexamethacrylate, III) from 0 to 40 parts by wt. of a monomer selected from the group consisting of pentaerythritol triacrylate, pentaerythritol tetraacrylate, dipentaerythritol tetraacrylate, dipentaerythritol pentaacrylate, dipentaerythritol hexaacrylate, pentaerythritol trimethacrylate, pentaerythritol tetramethacrylate, dipentaerythritol tetramethacrylate, dipentaerythritol pentamethacrylate, dipentaerythritol hexamethacrylate, reaction products thereof with aliphatic or aromatic diisocyanates, and mixtures thereof, IV) from 5 to 60 parts by wt. of a further mono-, di- or triacrylate or mono-, di- or trimethacrylate, wherein the parts by weight of components I) to IV) add up to 100 parts by wt., and, in addition to the 100 parts by wt., the lacquer composition further comprises V) from 0.1 to 10 parts by wt. of a photoinitiator.

10. The process according to claim 9, wherein the plurality of thermoplastic films comprises a thermoplastic film having a second outwardly facing side, which, in addition to the first outwardly facing side, also has the scratch-resistant coating.

11. The process according to claim 9, wherein the process further comprises impressing an item of information in the outwardly facing side the thermoplastic film.

12. The process according to claim 10, wherein the process further comprises impressing an item of information in the outwardly facing side the thermoplastic film and/or the second outwardly facing side of the thermoplastic film.

13. The process according to claim 9, wherein the thermoplastic film having the scratch-resistant coating is a film comprising a polycarbonate or copolycarbonate.

14. A thermoplastic film having a surface coated with a coating obtained from a lacquer composition comprising I) from 12 to 70 parts by wt. of a $C_2$-$C_{12}$-diol diacrylate or $C_2$-$C_{12}$-diol dimethacrylate, wherein $C_2$-$C_{12}$ represents a linear alkylene radical which can be optionally substituted by a methyl group or can be interrupted by one or more oxygen atom(s) and optionally substituted by one or more methyl group(s), II) from 12 to 40 parts by wt. of an alkoxylated mono-, di-, tri-, tetra-, penta- or hexaacrylate or alkoxylated mono-, di-, tri-, tetra-, penta- or hexamethacrylate, III) from 0 to 40 parts by wt. of a monomer selected from the group consisting of pentaerythritol triacrylate, pentaerythritol tetraacrylate, dipentaerythritol tetraacrylate, dipentaerythritol pentaacrylate, dipentaerythritol hexaacrylate, pentaerythritol trimethacrylate, pentaerythritol tetramethacrylate, dipentaerythritol tetramethacrylate, dipentaerythritol pentamethacrylate, dipentaerythritol hexamethacrylate, reaction products thereof with aliphatic or aromatic diisocyanates, and mixtures thereof, IV) from 5 to 60 parts by wt. of a further mono-, di- or triacrylate or mono-, di- or trimethacrylate, wherein the parts by weight of components I) to IV) add up to 100 parts by wt., and, in addition to the 100 parts by wt., the lacquer composition further comprises V) from 0.1 to 10 parts by wt. of a photoinitiator.

15. A lacquer composition comprising

I) from 12 to 70 parts by wt. of a $C_2$-$C_{12}$-diol diacrylate or $C_2$-$C_{12}$-diol dimethacrylate, wherein $C_2$-$C_{12}$ represents a linear alkylene radical which can be optionally substituted by a methyl group or can be interrupted by one or more oxygen atom(s) and optionally substituted by one or more methyl group(s), II) from 12 to 40 parts by wt. of an alkoxylated mono-, di-, tri-, tetra-, penta- or hexaacrylate or alkoxylated mono-, di-, tri-, tetra-, penta- or hexamethacrylate, III) from 0 to 40 parts by wt. of a monomer selected from the group consisting of pentaerythritol triacrylate, pentaerythritol tetraacrylate, dipentaerythritol tetraacrylate, dipentaerythritol pentaacrylate, dipentaerythritol hexaacrylate, pentaerythritol trimethacrylate, pentaerythritol tetramethacrylate, dipentaerythritol tetramethacrylate, dipentaerythritol pentamethacrylate, dipentaerythritol hexamethacrylate, reaction products thereof with aliphatic or aromatic diisocyanates, and mixtures thereof, IV) from 5 to 60 parts by wt. of a further mono-, di- or triacrylate or mono-, di- or trimethacrylate, wherein the parts by weight of components I) to IV) add up to 100 parts by wt., and, in addition to the 100 parts by wt., the lacquer composition further comprises V) from 0.1 to 10 parts of wt. of a photoinitiator.

* * * * *